JOHN KAFADER.

Improvement in Wagon-Tire Tightener.

No. 126,215.  Patented April 30, 1872.

Witnesses:
P. C. Dieterich
Francis McArdle

Inventor:
John Kafader
PER Munn & Co.
Attorneys.

UNITED STATES PATENT OFFICE.

JOHN KAFADER, OF JACKSONVILLE, OREGON.

IMPROVEMENT IN WAGON-TIRE TIGHTENERS.

Specification forming part of Letters Patent No. 126,215, dated April 30, 1872.

Specification describing a certain Improvement in Wagon-Tire Tightener, invented by JOHN KAFADER, of Jacksonville, in the county of Jackson and State of Oregon.

Figure 1:
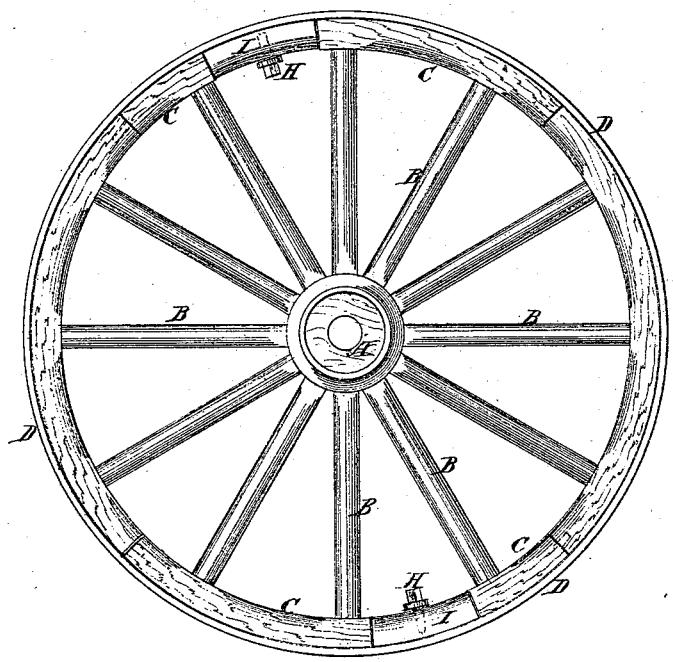
Figure 2:
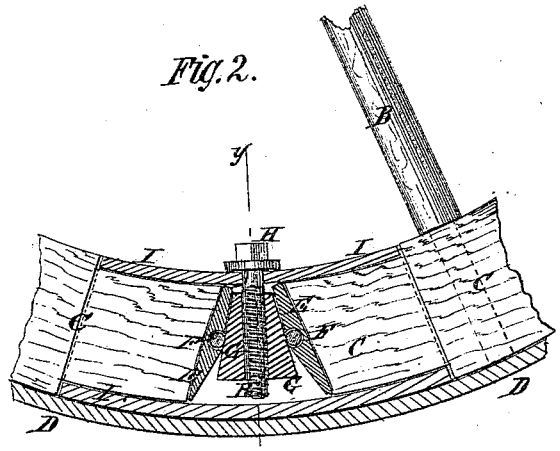
Figure 3:
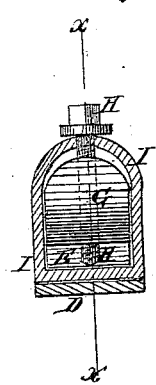

Figure 1 is a side view of a wagon-wheel, to which my improved device has been applied. Fig. 2 is a view of a portion of the same enlarged and partly in section through the line $x\ x$, Fig. 3, to show the construction. Fig. 3 is a detail cross-section taken through the line $y\ y$, Fig. 2.

My invention has for its object to furnish a neat, simple, convenient, and effective device for tightening and securing tires upon the fellies of wheels, both when first applied and when they may have become loose from use; and it consists in the construction and combination of the various parts of the device, as hereinafter more fully described.

A is the hub; B are the spokes; C are the fellies; and D is the tire of the wheel. The adjacent ends of the fellies C upon the opposite sides of the wheel are cut away, or said fellies are made a little short, so as to leave narrow spaces between said ends, as shown in Fig. 2. Within this space and resting against the ends of the fellies are placed two plates, E. The sides of the plates E that rest against the ends of the fellies C are made flat to bear squarely against said ends. The other or inner sides of the plates E incline in both directions from the center, as shown in Fig. 2. In holes in the plates E, at their angles, are placed small rollers, F, said holes being so formed that the sides of the rollers F may project sufficiently to receive the wear. Between the plates E is placed a wedge-shaped block, G, with its smaller end toward the hub of the wheel. Through the center of the wedge-block G is formed a screw-hole to receive the screw H, which passes in from the inner side of the rim through the casing I, against which a collar formed upon the said screw H rests, so that by turning the screw H forward the wedge-block G will be drawn between the plates E, expanding the rim of the wheel, and thus tightening and securing the tire. The tubular casing I is made of the same form and size as the fellies, and is let into the ends of said fellies, as shown in Fig. 2, so that the outer surface of said case may be flush with the outer surface of said fellies. With this construction, should the tire become loose from use or other cause, a turn or two of the screws H will expand the rim of the wheel and tighten the tire securely.

Having thus described my invention, I claim as new and desire to secure by Letters Patent—

The plates E, provided with rollers F, wedge-shaped block G, screw H, and case I, in combination with each other, substantially as herein shown and described, to adapt them for attachment to the adjacent ends of the fellies, for the purpose set forth.

JOHN KAFADER.

Witnesses:
    WM. FORSYTH,
    THOMAS CALLAN.